(12) United States Patent
Gonzalez

(10) Patent No.: US 11,287,143 B2
(45) Date of Patent: Mar. 29, 2022

(54) ADVANCED HYBRID TANK, ADVANCED PV COOLING PANEL, ADVANCED THERMAL FOCUSING PANEL

(71) Applicant: Mike Montauk Gonzalez, Manteca, CA (US)

(72) Inventor: Mike Montauk Gonzalez, Manteca, CA (US)

( * ) Notice: Subject to any disclaimer, the term of this patent is extended or adjusted under 35 U.S.C. 154(b) by 186 days.

(21) Appl. No.: 16/443,668

(22) Filed: Jun. 17, 2019

(65) Prior Publication Data

US 2019/0376695 A1    Dec. 12, 2019

Related U.S. Application Data

(62) Division of application No. 15/426,010, filed on Feb. 6, 2017, now Pat. No. 10,816,220.

(51) Int. Cl.
| | | |
|---|---|---|
| F24D 17/00 | (2006.01) | |
| E04D 13/17 | (2006.01) | |
| F24S 10/75 | (2018.01) | |
| F24S 80/30 | (2018.01) | |
| F24S 60/30 | (2018.01) | |
| B61D 17/12 | (2006.01) | |
| F24S 20/67 | (2018.01) | |
| E04D 3/06 | (2006.01) | |
| E04B 7/02 | (2006.01) | |

(52) U.S. Cl.
CPC ......... *F24D 17/0021* (2013.01); *B61D 17/12* (2013.01); *E04D 3/06* (2013.01); *E04D 13/17* (2013.01); *F24S 10/753* (2018.05); *F24S 20/67* (2018.05); *F24S 60/30* (2018.05); *F24S 80/30* (2018.05); *E04B 7/022* (2013.01); *E04D 13/172* (2013.01); *Y02B 10/20* (2013.01); *Y02E 10/44* (2013.01)

(58) Field of Classification Search
CPC ......... E04D 13/17; E04D 3/06; E04D 13/172; F24D 17/0021; F24D 17/0015; F24S 10/753; F24S 20/67; F24S 60/30; F24S 80/30; Y02B 10/20; Y02E 10/44; B61D 17/12; E04B 7/022
USPC ....... 165/48.1, 48.2, 50, 53, 54, 56; 126/639
See application file for complete search history.

(56) References Cited

U.S. PATENT DOCUMENTS

| | | | | |
|---|---|---|---|---|
| 4,186,726 A | * | 2/1980 | Spencer ................. | F24S 10/72 126/672 |
| 4,531,510 A | * | 7/1985 | Barthez ................... | F24S 50/40 126/591 |
| 4,787,444 A | * | 11/1988 | Countryman ......... | F25B 29/003 165/48.2 |
| 5,269,363 A | * | 12/1993 | Witte ..................... | B22C 15/24 164/186 |
| 6,357,512 B1 | * | 3/2002 | Baer ...................... | F24F 5/0046 165/48.2 |

(Continued)

*Primary Examiner* — William V Gilbert

(57) ABSTRACT

The thermal hybrid tank is a multifunctional tank with a shape that makes for easy construction and assembly while maximizing the ability of thermal syphoning. This invention can store an inlet liquid and thermal energy from a heat exchanger, for outlet usage in multiple applications. The tank typically has a pitch coupling front surface and a downward angled front surface which together allows for coupling with the heat exchanger and a roof decking or a solar panel, of which could be a liquid cooled PV solar panel, or a solar focusing panel, or a roof structure.

15 Claims, 2 Drawing Sheets

(56) References Cited

U.S. PATENT DOCUMENTS

2009/0301687 A1\* 12/2009 Watts ..................... F24S 90/00
                                                    165/48.2

\* cited by examiner

ADVANCED HYBRID TANK, ADVANCED PV COOLING PANEL, ADVANCED THERMAL FOCUSING PANEL

CROSS-REFERENCE TO RELATED APPLICATIONS

Ser. No. 15/426,010 with a filing date of Feb. 6, 2017.

STATEMENT REGARDING FEDERALLY SPONSORED RESEARCH OR EMPLOYMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

This invention relates to solar energy panels and tanks for thermal transfer. The invention is shaped to allow coupling with a roof decking or a solar energy panel and is shaped by a coupling side being pitched downward and away from the tanks top surface, the top surface being opposite of the base side, and a heat exchanger connection side being tilted approximately perpendicular to the coupling side as to have the heat exchanger connections being similarly pitched downward and away from the tanks top surface, while containing a liquid to perform thermal transfer. The pitch of a roof decking or a solar energy panel is typically written in the form of rise/run.

A thermal syphoning tank is placed at a higher elevation than a heat exchanger element to generate the effect of thermal syphoning. A standard thermal syphoning tank is typically placed on top of a roof to collect solar radiation. This type of tank is typically cylindrical and placed exterior of the roof decking, which can add stress to an existing roof and may not be esthetically pleasing.

A heat exchanger element is typically tilted toward the equator to collect solar heat using a liquid to transfer heat to a tank. This stored heat is typically utilized by passing water through a coiled pipe in the tank, as a closed system, to allow water in the coiled pipe to absorb heat from the heated liquid in the tank, and provide heated water to showers or sinks. This type of system only heats a volume of water that passes through the coil and therefore requires a secondary tank to heat and store a larger volume or quantity. Additionally, heat can be lost during transfer to a second tank.

A photovoltaic panel, or PV solar panel, utilizes photovoltaic cells to produce electricity from received light. This type of solar panel is mounted to receive solar energy and will receive solar thermal energy as well. This solar thermal energy decreases the PV solar panel's energy production, therefore, the hotter the panel, the less energy efficient it becomes. The PV solar panel could produce more energy by being cooled.

BRIEF SUMMARY OF THE INVENTION

The invention can be integrated into a roof of a building or a vehicle as to collect and store thermal energy. This invention improves how a thermal syphon tank is attached and integrated with a building, by having a shape to allow interior attachment and coupling with a roof having a pitch. Coupling the heat exchanger with a liquid cooled photovoltaic solar panel or a solar focusing panel, and further coupling with a roof's decking, will produce a sleek heat exchanger element to extract heat. Lenses applied to a heat exchanger element having pipes, can focus energy on the pipes to improve thermal collection from the sun. Additionally, the invention may extract thermal energy from photovoltaic cells to improve electrical production efficiency.

A frame is a support structure used to raise the tank above the heat exchanger and used to configure and install the invention into an existing roof structure, while possibly improving both the existing structure's load-bearing capacity and it's resistance to earthquakes.

BRIEF DESCRIPTION OF THE MULTIPLE VIEWS OF THE DRAWINGS

DETAILED DESCRIPTION

Figure 1:
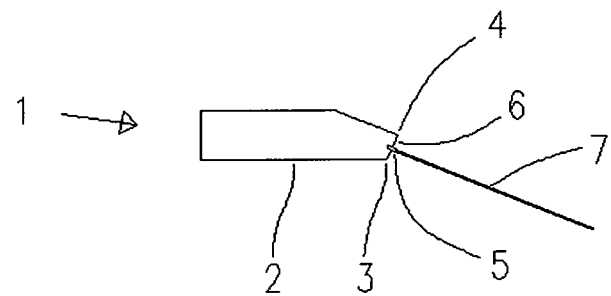
FIG. 1 is a side view of the tank's general shape.

FIG. 1 shows the invention 1 with a base side 2 joining the adjacent front surface being a heat exchanger connection side 6, to create an obtuse angled corner 3. The obtuse angled corner 3 of the heat exchanger connection side 6 is followed by a right angled corner 4. The heat exchanger connection side 6, between the obtuse angled corner 3 and the right angled corner 4, is shown to create and have a downward angled outlet connection 5 for connecting the heat exchanger 7 and pitching the heat exchanger 7 as to be approximately perpendicular to the heat exchanger connection side 6, to maximize thermal transfer.

Figure 2:
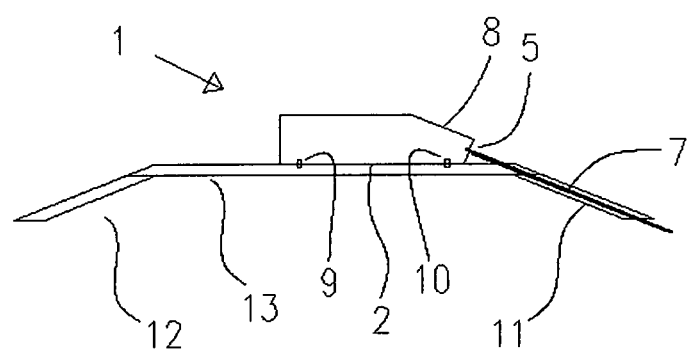
FIG. 2 is a side view of the tank on a stand and with a heat exchanger.

In FIG. 2, the downward angled outlet connection 5 can be used to connect a heat exchanger 7 with liquid to flow into the tank at this outlet connection by thermal syphoning. The base side 2 is shown with a lower surface outlet connection 10 for liquid supply to the heat exchanger 7, yet could instead be placed on any surface at any height from the base side to half way up the tank. The inlet connection 9 allows for an inlet liquid supply.

FIG. 2 shows the invention 1 with a frame being the support structure comprising a first plurality of column members 11 and a second plurality of column members 12 being attached to opposing ends of the plurality of beam members 13. The first plurality of column members 11 are pitched similar to the coupling side 8 and the heat exchanger 7.

Figure 3:
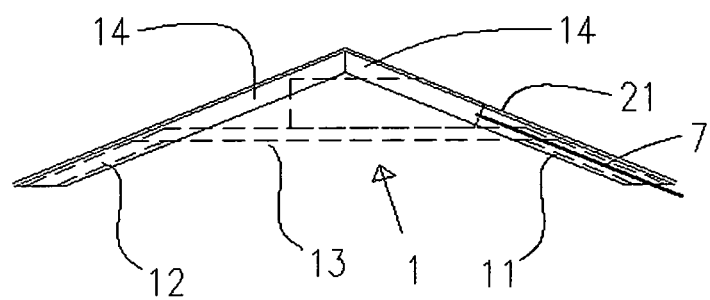
FIG. 3 is a side view of the tank and a frame for support being in an existing roof structure.

FIG. 3 shows the tank being coupled with an existing roof structure with members of a frame. The first plurality of column members 11 and the second plurality of column members 12, are shown attached between the rafter members 14 and beneath a roof decking 21 with the desired pitch of the coupling side 8. The plurality of beam members 13 are shown to collar tie the rafter members 14.

Figure 4:
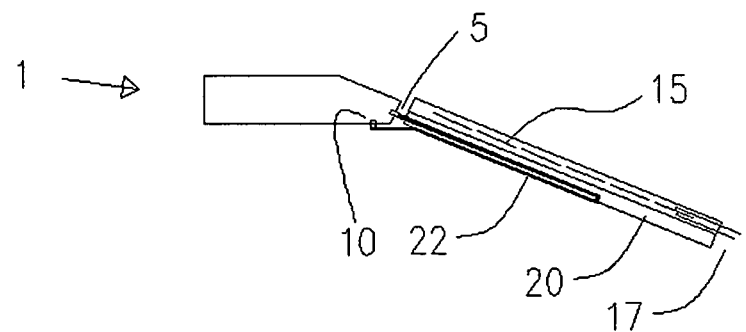
FIG. 4 is a side view of the liquid cooled photovoltaic solar panel being a heat exchanger with embedded pipes and embedded PV cells.

FIG. 4 shows the liquid cooled photovoltaic solar panel having pipes 22 as the bottom ply 20 of the panel and with photovoltaic cells 15 as the upper ply of the panel. The heat exchanger connections 5 and 10 allow liquid flow and thermal communication with the tank. The panel electrical connection 17 allows photovoltaic electrical energy to be utilized in an electrical system.

Figure 5:
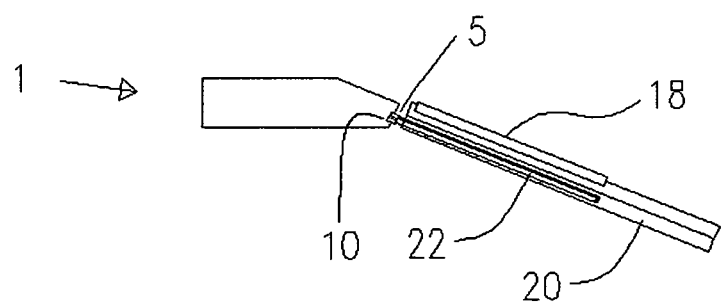
FIG. 5 is a side view of the solar focusing panel being a heat exchanger with embedded pipes and embedded lenses.

FIG. 5 shows the solar focusing panel having pipes 22 as the bottom ply 20 of the panel and lens rods 18 as the upper ply of the panel. The heat exchanger connections 5 and 10 allow liquid flow and thermal communication with the tank.

Figure 6:
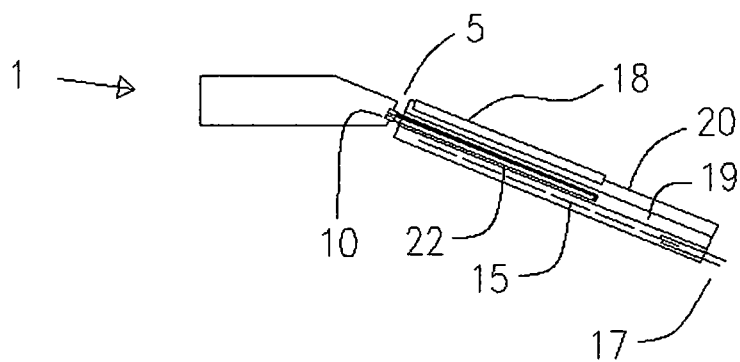
FIG. 6 is a side view of combining the liquid cooled photovoltaic solar panel of FIG. 4 and the solar focusing panel of FIG. 5.

FIG. 6 shows a thermal hybrid panel having the liquid cooled photovoltaic solar panel of FIG. 4 and the solar focusing panel of FIG. 5 being fused together with a ply 19 that can be considered a joining ply when fusing a plurality of plies.

The invention claimed is:

1. A thermal hybrid tank, an apparatus for heating and containing a liquid by being coupled with a heat exchanger, and the tank having a shape resulting in said heat exchanger and a coupling side being pitched similarly downward and away from a top surface of the tank, the top surface being opposite of a base side, comprising;
   the base side;
   a heat exchanger connection side;
   the coupling side;
   an inlet connection or a plurality of inlet connections;
   an outlet connection or a plurality of outlet connections;
   the inlet connection or the plurality of inlet connections allowing for said liquid to be let into the tank;
   the outlet connection or the plurality of outlet connections allowing for said liquid to be let out for usage and allowing for the connection of said heat exchanger;
   the heat exchanger connection side having the outlet connection or the plurality of outlet connections, as to result in said outlet connection or said plurality of outlet connections for the heat exchanger, being outward and downward of the tank;
   the coupling side having a desired pitch being between, written in the form of rise/run, 2.115/12 and 44.8/12 when in an installed condition;
   said heat exchanger being connected between the outlet connection or the plurality of outlet connections of the heat exchanger connection side and the outlet connection or the plurality of outlet connections of the tank; and
   the thermal hybrid tank consisting of a material selected from the group of glass, ceramic, plastic, metal, and any combination thereof.

2. The thermal hybrid tank according to claim 1, wherein the tank is coupled with a frame as to be a free-standing structure, comprising;
   a first plurality of column members;
   a second plurality of column members;
   a plurality of beam members;
   the first plurality of column members being spaced and having said desired pitch of the coupling side;
   the second plurality of column members being spaced and having an opposing pitch between 10 degrees below the plurality of beam members and 90 degrees below the plurality of beam members;
   the first plurality of column members and the second plurality of column members being connected at opposite ends of the plurality of beam members and extending downward to connect with a base area or a built volume; and
   the tank being attached to the plurality of beam members.

3. The thermal hybrid tank according to claim 2, wherein said free-standing structure is attached to a roof structure as to reinforce said roof structure, further comprising;
   the first plurality of column members and second plurality of column members being attached to the corresponding members or said roof structure; and
   the plurality of beam members spaced parallel, spanning horizontally, and collar tying the first plurality and second plurality of corresponding members of the roof structure.

4. The thermal hybrid tank according to claim 2, wherein the thermal hybrid tank includes said heat exchanger being a thermal hybrid panel, further comprising;
   a panel;
   a pipe or a plurality of pipes for use with the liquid;
   the panel consisting of a material selected from the group of metal, plastic, glass, and any combination thereof;
   said pipe or said plurality of pipes being aligned linearly and coupled or embedded with the panel for thermal transfer;
   said pipe or said plurality of pipes consisting of a material selected from the group of metal, plastic, glass, and any combination thereof;
   the panel being a ply or a plurality of plies;
   said pipe or said plurality of pipes having an inlet connection or a plurality of inlet connections;
   said pipe or said plurality of pipes having an outlet connection or a plurality of outlet connections;
   a plurality of photovoltaic cells;
   said plurality of photovoltaic cells being embedded or being applied to the panel and having an electrical connection;
   the heat exchanger being attached to the first plurality of column members of said free-standing structure;
   the outlet connection or the plurality of outlet connections of said heat exchanger being connected to the outlet connection or the plurality of outlet connections of the heat exchanger connection side; and
   the inlet connection or the plurality of inlet connections of said heat exchanger being connected to the outlet connection or the plurality of outlet connections of the tank, as to be in fluid communication.

5. The thermal hybrid tank according to claim 4, being coupled with an upper covering of a roof structure, further comprising;
   the heat exchanger being integrated into said upper covering of said roof structure; and
   the frame connecting with the base area or the built volume of said roof structure.

6. The thermal hybrid tank according to claim 4, further comprising;
   the plurality of photovoltaic cells being beneath the pipe or the plurality of pipes.

7. The thermal hybrid tank according to claim 4, comprising;
   said pipe or said plurality of pipes being the ply or the plurality of plies of said panel; and
   said plurality of photovoltaic cells being the ply or the plurality of plies of said panel.

8. The thermal hybrid tank according to claim 2, wherein the thermal hybrid tank includes said heat exchanger being a thermal hybrid panel, further comprising;
   a panel;
   a pipe or a plurality of pipes for use with the liquid;
   said panel consisting of a material selected from the group of metal, plastic, glass, and any combination thereof;

said pipe or said plurality of pipes being aligned linearly and coupled or embedded with the panel for thermal transfer;

said pipe or said plurality of pipes consisting of a material selected from the group of metal, plastic, glass, and any combination thereof;

a lens rod or a plurality of lens rods;

the lens rod or the plurality of lens rods having a diameter to make a focal point;

the focal point being on the outside surface of a pipe or at the inside core of a pipe;

the lens rod or the plurality of lens rods being positioned above said pipe or said plurality of pipes and being embedded in the panel;

the panel being a ply or a plurality of plies;

said pipe having an inlet connection and an outlet connection or said plurality of pipes having an inlet connection or a plurality of inlet connections and an outlet connection or a plurality of outlet connections;

said heat exchanger being attached to the first plurality of column members of said free-standing structure;

the outlet connection or the plurality of outlet connections of said heat exchanger being connected to the outlet connection or the plurality of outlet connections of the heat exchanger connection side; and the inlet connection or the plurality of inlet connections of said heat exchanger being connected to the outlet connection or the plurality of outlet connections of the tank, as to be in fluid communication.

9. The thermal hybrid tank according to claim 8, being coupled with an upper covering of a roof structure, further comprising;

the heat exchanger being integrated into said upper covering of said roof structure; and the frame connecting with the base area or the built volume of said roof structure.

10. The thermal hybrid tank according to claim 8, comprising;

said pipe or said plurality of pipes being the ply or the plurality of plies of said panel; and said lens rod or said plurality of lens rods being the ply or the plurality of plies of said panel.

11. The thermal hybrid tank according to claim 1, wherein the tank is coupled with a roof structure having an upper covering or a frame having the upper covering and the upper covering having approximately the desired pitch of the coupling side, further comprising;

the coupling side allowing the coupling of said tank and said heat exchanger by having the coupling side and the heat exchanger being next to and under the upper covering;

the heat exchanger having or being aligned to approximately the desired pitch of said coupling side and said upper covering; and the upper covering being attached to the roof structure or the frame.

12. The thermal hybrid tank according to claim 1, wherein the inlet connection or the plurality of inlet connections or the outlet connection or the plurality of outlet connections of the tank are improved as one of the following;

a switch connection;

a sensor connection;

a pressure relief connection;

a steam distribution connection;

a steam turbine connection;

a pump connection;

or a drain connection.

13. The hybrid tank according to claim 1, wherein said tank is constructed within a size range, further comprising;

a width;

the tank having the width being along the edge between the base side and the heat exchanger connection side; and the width being less than 24 inches.

14. The thermal hybrid tank according to claim 1, wherein said tank is made of sheeting and a plurality of rivets, further comprising;

the plurality of rivets comprised of the same material as the tank; and said tank being made to contain the liquid by soldering or welding the plurality of rivets.

15. The thermal hybrid tank according to claim 1, wherein said tank is made to contain the liquid by welding seams.

* * * * *